(12) United States Patent
Wilby

(10) Patent No.: US 8,390,479 B2
(45) Date of Patent: Mar. 5, 2013

(54) DEVICE FOR LOCKING A MOVABLE COMPONENT OF AN AIRCRAFT

(75) Inventor: Richard Wilby, Pibrac (FR)

(73) Assignee: Airbus, Blagnac (FR)

( * ) Notice: Subject to any disclaimer, the term of this patent is extended or adjusted under 35 U.S.C. 154(b) by 1086 days.

(21) Appl. No.: 12/299,827

(22) PCT Filed: May 9, 2007

(86) PCT No.: PCT/FR2007/051239
§ 371 (c)(1), (2), (4) Date: Nov. 6, 2008

(87) PCT Pub. No.: WO2007/132111
PCT Pub. Date: Nov. 22, 2007

(65) Prior Publication Data
US 2009/0242696 A1    Oct. 1, 2009

(30) Foreign Application Priority Data
May 17, 2006    (FR) ...................................... 06 51794

(51) Int. Cl.
*G08B 21/00*    (2006.01)
(52) U.S. Cl. .................. 340/960; 340/12.51; 244/100 R
(58) Field of Classification Search ............ 244/102 SL, 244/102 A, 102 R, 100 R; 340/960, 12.51, 340/13.26; 343/705
See application file for complete search history.

(56) References Cited

U.S. PATENT DOCUMENTS

| 5,099,226 A | * | 3/1992 | Andrews | 340/505 |
| 5,333,816 A | | 8/1994 | Del Monte | |
| 5,860,622 A | | 1/1999 | Weibert | |
| 7,270,353 B2 | * | 9/2007 | Sironi et al. | 292/307 R |
| 7,808,367 B2 | * | 10/2010 | Moore | 340/10.3 |
| 2003/0206786 A1 | | 11/2003 | Smith | |
| 2005/0156600 A1 | * | 7/2005 | Olsson et al. | 324/329 |
| 2007/0052539 A1 | * | 3/2007 | Brown | 340/571 |
| 2007/0197261 A1 | * | 8/2007 | Humbel | 455/558 |
| 2008/0060846 A1 | * | 3/2008 | Belcher et al. | 175/25 |

FOREIGN PATENT DOCUMENTS

| DE | 40 29 208 | | 3/1992 |
| EP | 1 031 685 | | 8/2000 |
| WO | 94 07743 | | 4/1994 |
| WO | 01 54080 | | 7/2001 |
| WO | 2004075102 A1 | * | 9/2004 |
| WO | 2005 006261 | | 1/2005 |

OTHER PUBLICATIONS

English Translation of WO2004/075102A1—see attached.*

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

A device for locking a movable component of an aircraft. The device includes an electronic tag adapted for receiving a polling signal and returning an identification signal. An onboard system allows detection of such locking devices.

12 Claims, 2 Drawing Sheets

DEVICE FOR LOCKING A MOVABLE COMPONENT OF AN AIRCRAFT

TECHNICAL FIELD

This invention relates to the field of devices for locking a movable component of an aircraft.

BACKGROUND OF THE INVENTION

When an airplane is parked on the ground in order to undergo clearing or maintenance operations, some of its components have to be blocked or clamped mechanically in order to avoid untimely actuation thereof, due to a human mistake or failure of a control system. It is known in particular to immobilize the landing gear of an airplane for maintenance or handling needs on the ground. For this purpose, conventionally steel pins or collars are used, which enable locking of the movable parts of the landing gear, e.g. mechanical hinges or extended landing gear actuators. Such locking devices on the ground are generally equipped with visual identification signs, such as bright colored flags or pennants, so as to be easily spotted by the ground personnel. As a matter of fact, it is mandatory to release the movable parts before take-off, otherwise serious incidents may happen in flight. In spite of precautions taken and a systematic check-up, it still happens regularly that landing gear locking devices are not removed at the pre-flight inspection. If the landing gear cannot be raised, the plane has to return immediately to its departure airport. It is estimated that about 11% of returns to the departure airport, associated with a landing gear problem, are due to a forgotten locking device. Each return implies previously dumping kerosene in order to reduce the weight of the plane below the maximum weight admitted for landing. Such an operation is particularly harmful for the environment and costly, both in terms of fuel and grounding.

Among the causes identified as having led to a forgotten locking device, in particular damaged or missing visual identification signs have been noted. As a matter of fact, flags or pennants can get loose due to wear or incorrect handling, or else they can get stuck in an adjacent part due to the wind, thus hiding from the ground personnel's view.

In order to make them easier to spot, locking devices are sometimes painted in a bright color. However, paints are rapidly eroded by the phosphorus esters existing in most hydraulic fluids, so that locking devices may go unnoticed, in particular under conditions of bad lighting or poor visibility.

A first objective of the invention is to propose a locking device the presence of which can be detected easily and rapidly. A second objective of the invention is to provide a locking device on the ground, which can be detected with very high reliability. A third objective of the invention is to provide a system for automatically detecting said locking devices.

DISCLOSURE OF THE INVENTION

The present invention is defined by a device for locking a movable component of an aircraft comprising an electronic tag adapted for receiving a polling signal and returning an identification signal of said device.

According to a first embodiment, the locking device is shaped as a pin.

Advantageously, the pin has a cylindrical part having an annular groove wherein an omnidirectional antenna is mounted. The antenna is preferably sealingly covered by an elastomer layer.

According to a second embodiment, the locking device has the shape of a collar comprising two shells linked together by means of a longitudinal hinge.

Advantageously, at least one of these shells includes a semi-cylindrically shaped part having a substantially semi-annular groove, wherein an antenna element is mounted. The antenna element is preferably sealingly covered by an elastomer layer.

The invention is also defined by a system for detecting at least one such locking device, comprising:
 means for reading at least one electronic tag for transmitting a polling signal and receiving a reply containing identification data of said device;
 control means controlling said reading means and receiving said identification data via an avionics communication network; and
 signaling means indicating whether a locking device has been identified.

The signaling means is advantageously adapted for indicating the location of the locking device on an outline representation of the aircraft and/or emitting a sound signal if a locking device has been detected.

Finally, the invention also relates to an aircraft, having on board such a detecting system.

BRIEF DESCRIPTION OF THE DRAWINGS

Other characteristics and advantages of the invention will be apparent from reading a preferred embodiment of the invention with reference to the appended figures, wherein.

DETAILED DISCLOSURE OF SPECIFIC EMBODIMENTS

The basic concept of the invention is to fit ground locking devices with electronic RFID (Radio Frequency IDentification) tags, also called "RFID tags" or just "tags".

Electronic tags are well known from the state of the art. They have the advantage of not requiring a stand-alone power supply. In general, an electronic tag includes an antenna, a non volatile memory wherein identification information is stored, a modulator for modulating, by means of said information, a polling signal received by the antenna before retransmitting the signal thus modulated. A power circuit using the energy of the polling signal is provided for feeding the modulator. Thus, when the electronic tag receives a polling signal at a predetermined frequency, this signal is detected for feeding the modulator, and a reply containing identification information is returned to the polling device.

Figure 1A:
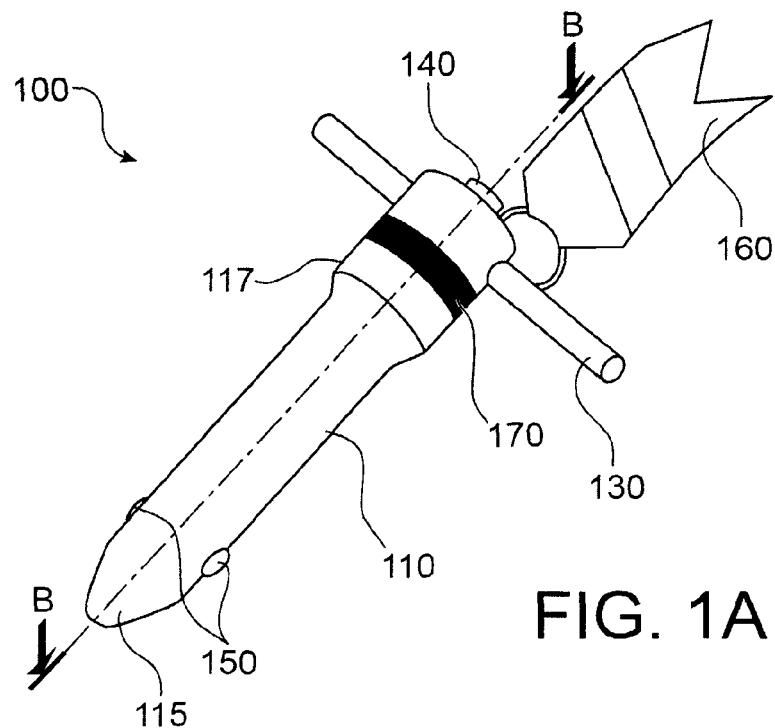
FIG. 1A represents a locking device according to a first embodiment of the invention.

FIG. 1A illustrates a locking device according to a first embodiment of the invention. It has the shape of a pin 100 comprising a first cylindrical part 110 extending at the lower part thereof in a conoidal shape 115 and at the upper part thereof in a second cylindrical part 117, coaxial with the first one but of a larger diameter. The first cylindrical part is to be slidingly engaged in a corresponding cavity of the landing gear, e.g. in a component of the structure which unfolds when the landing gear is extended and/or retracts when it is raised.

The second cylindrical part is to remain outside said cavity. A rod 130 goes diametrically through the pin at the upper end thereof while substantially protruding on either side of the second cylindrical part, so as to facilitate removal and manipulation of the locking pin. A piston 140 is provided for sliding inside the first and second cylindrical parts according to an axial stroke limited by a lower stop and an upper stop. In standby position, the piston is held against the upper stop by a return spring and slightly protrudes from the upper part of the second cylindrical shape. In this position, the piston has two lugs 150 protruding radially out of the first cylindrical part. More precisely, these lugs, advantageously steel balls, are spring-mounted and located, diametrically opposite each other, in the lower part of the first cylindrical part. When a handling operator wants to lock the landing gear, he drives the pin into the corresponding cavity. The lugs 150 penetrate into their housings when the operator presses the piston 140 to bring it against the lower stop or else when the pin is forcibly driven into the cavity thereof. Once the pin is in place, the lugs naturally return to the protruding position and rest in corresponding recesses of the cavity. To release the pin, the piston 140 just has to be pressed, so that the lugs are retracted and the pin can be removed from the cavity thereof. The second cylindrical part of the locking pin has an annular cutout, wherein the antenna of the electronic tag is mounted. The antenna is covered by an elastomer layer 170, preferably chosen with a bright color. Finally, a flag or pennant 160 also brightly colored is advantageously attached to the locking pin by means of a ring, a strap or a resistant string.

Figure 1B:
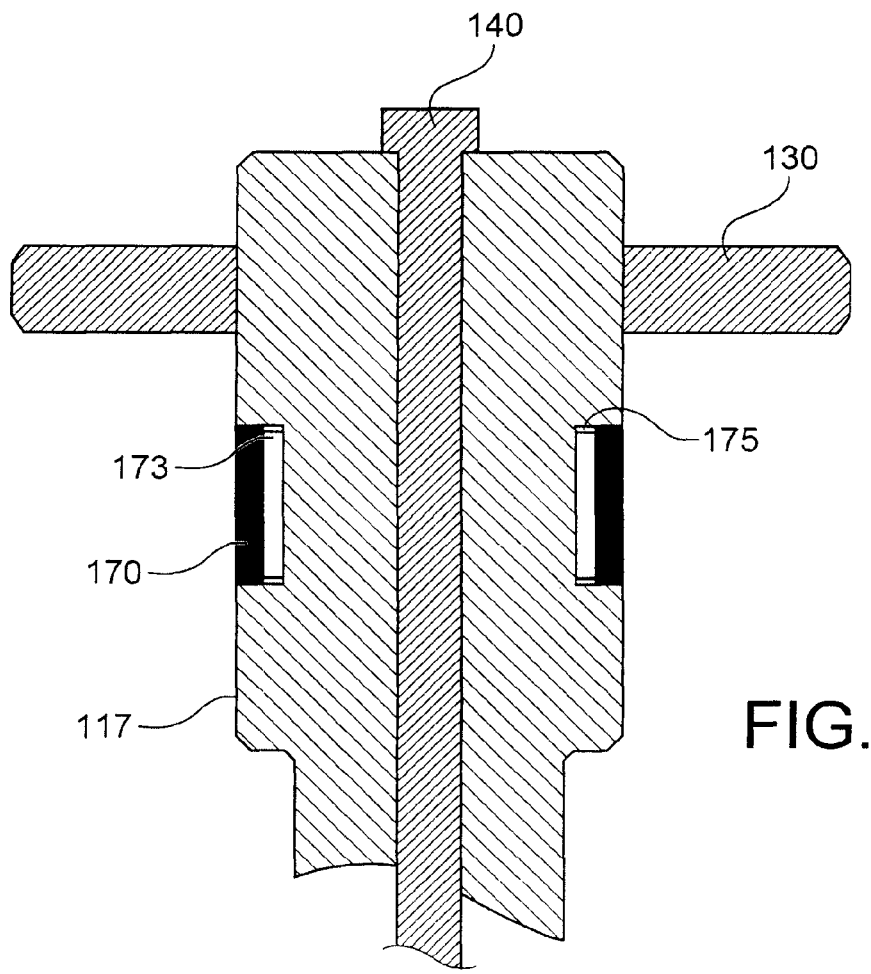
FIG. 1B represents an axial section of the device of FIG. 1A.

FIG. 1B represents the top of the locking pin according to an axial section. In particular, the annular cutout 175 can be seen, wherein the antenna 173 is mounted, in turn covered by an elastomer ring 170 sealingly protecting the antenna, in particular from corrosion by hydraulic fluids. As the antenna is housed in the second cylindrical part, which is to remain outside of the cavity, it can transmit and receive an electromagnetic signal without shadowing. The antenna is advantageously an omnidirectional antenna, divided or not into a plurality of sectors. The electronic RFID circuit associated with the antenna is also housed in the second cylindrical part in a cavity (not represented) protected from impacts and mechanical stress.

Figure 2:
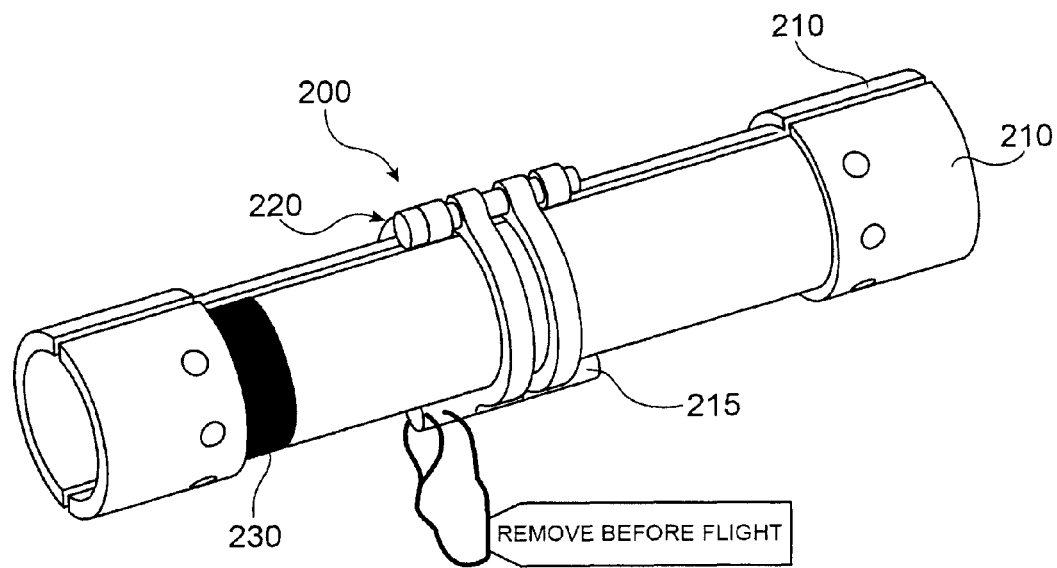
FIG. 2 represents a locking device according to a second embodiment of the invention.

FIG. 2 represents a locking device according to a second embodiment of the invention. It is composed of a collar 200 e.g. for blocking an extended landing gear actuator. It has two shells 210 hinged about a longitudinal hinge 215. The free ends of the shells can be made integral by means of a quick coupling system or a simple bolt-and-nut system 220. The shells are substantially of semi-cylindrical shape or else are composed of semi-cylindrically shaped parts allowing for withdrawal of the actuator to be prevented. A brightly colored pennant or flag is also attached to said collar. One or both semi-cylindrical shells of the collar have a cutout at the outer surface thereof, as a semi-annular groove, wherein the antenna in housed. Advantageously, the antenna will include two semi-annular elements mounted in the respective grooves of both shells. The antenna or the two antenna elements are electrically connected to the electronic RFID circuit, in turn installed in one of the shells while being protected from impacts and mechanical stress. Each part of the antenna is also covered by a brightly colored elastomer layer 230.

The previously described locking devices can be used for immobilizing a movable part of the airplane when it is on the ground, e.g. a component of the front landing gear or of the main landing gear.

In order to detect the presence or check for the absence of such locking devices, the aircraft is provided with a plurality of antennas distributed over the fuselage, designed for transmitting a polling signal.

Such antennas are advantageously conformal antennas, i.e. integrated in and of the same shape as the fuselage or else mounted on the internal surface of the parts of composite material, of low electromagnetic absorption, of the nose and the flaps of the landing gear of the aircraft. The antennas are advantageously arranged so that the locking devices are capable of receiving the polling signal in line of sight or LOS.

The various antennas are coupled with RFID reading devices. When a RFID reading device receives the instruction to check for the presence of a locking device, it transmits a polling signal composed of a low frequency electromagnetic wave, e.g. at 125 kHz or 134.2 kHz. By using low frequency the phenomena of absorption and diffraction by the metallic structures of the airplane can be reduced and a relatively uniform electromagnetic field in the polling area can be obtained. Furthermore, devices for reading electronic tags are commonly available at these frequencies. A locking device receiving said polling signal returns to the reading device a reply containing its identification data. This data indicates that the reply is sent by a locking device and, if necessary, the type of device involved. Thus, if locking devices of different types are used for blocking different components of the aircraft, the detection of a locking device will be associated uniquely with the corresponding component of the aircraft.

Figure 3:
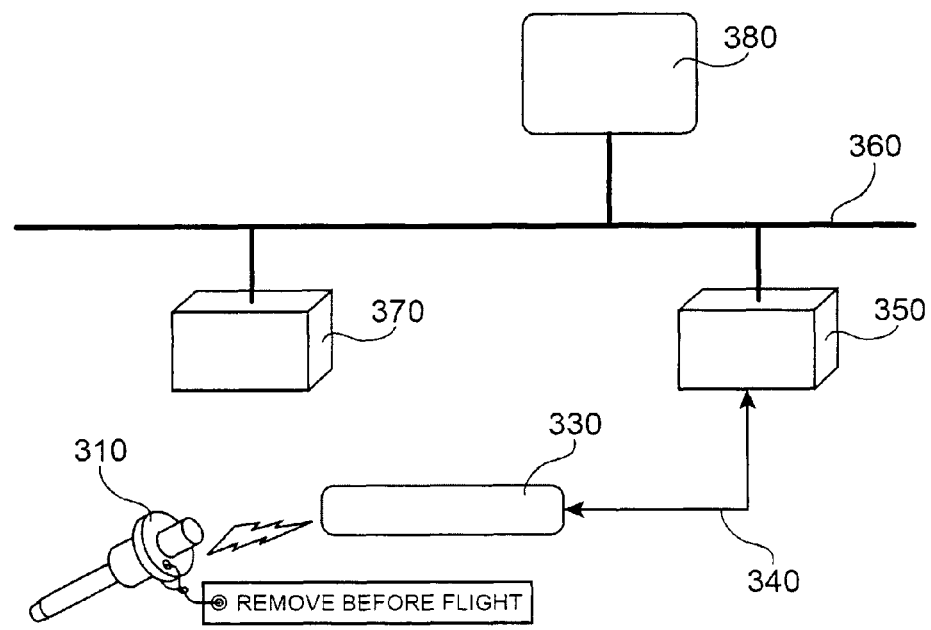
FIG. 3 schematically represents an avionics system for detecting the presence of a locking device according to the invention.

FIG. 3 schematically illustrates an avionics system allowing for detection of the presence or not of locking devices according to the invention.

Each reading device 330 is connected to a control and acquisition module 350, in turn connected to an avionics communication network 360 complying with an ARINC standard, e.g. a switched Ethernet network such as an AFDX (Avionics Full Duplex Switched Ethernet) network. A warning system called FWS (Flight Warning System), in charge of monitoring failures of various components of the aircraft and determining dangerous flight conditions, is also connected to the network. The warning system 370 can trigger, either automatically or by manual activation, a check for the presence or absence of locking devices. This check will be performed especially systematically during the control procedure before take-off. It can also be initiated by the maintenance personnel in order to ensure that all of the locking devices have been properly placed. The warning system 370 transmits to the reading devices 330 a polling instruction via the control and acquisition modules 350. Alternatively, it can transmit such an instruction sequentially to various devices. If a reading device 330 detects a reply, it returns to the warning system, via its associated control and acquisition module, the identification information of the locking device having replied. Advantageously, the electronic tags of the locking devices transmit their respective replies with different time delays in order avoid collisions. For this purpose, each tag can be equipped with an up-counter or a down-counter set to a different value and reply only when it has expired. The warning system 370 centrally receives the replies of the various modules 350. It can thus determine if a locking device is present and, if required, identify it. If a locking device is present, it generates an alarm composed of a sound signal and/or light indications on a control panel 380 of the cockpit. Light indications advantageously appear on an outline representation of the aircraft, so that the location of a locking device abnormally present or absent can be located immediately. The present invention thus enables the ground team to remove the locking device before the airplane leaves the airport.

The invention claimed is:

1. A removable locking device engaged with a movable component of landing gear of an aircraft, comprising:
   an electronic tag adapted for receiving a polling signal and returning an identification signal of the device.

2. The removable locking device according to claim 1, having a shape of a pin.

3. The removable locking device according to claim 2, wherein the pin comprises a cylindrical part including an annular groove, wherein an omnidirectional antenna is mounted.

4. The removable locking device according to claim 3, wherein the antenna is sealingly covered by an elastomer layer.

5. The removable locking device according to claim 1, having a shape of a collar comprising two shells linked to each other by a longitudinal hinge.

6. The removable locking device according to claim 5, wherein at least one shell includes a part of semi-cylindrical shape having a substantially semi-annular groove, wherein an antenna element is mounted.

7. The removable locking device according to claim 6, wherein the antenna element is sealingly covered by an elastomer layer.

8. A system for detecting at least one removable locking device according to claim 1, comprising:
   means for reading at least one electronic tag for transmitting a polling signal and receiving a reply containing identification data of the device;
   controlling means controlling the means for reading and receiving the identification data via an avionics communication network; and
   signaling means indicating whether a locking device has been identified.

9. The detecting system according to claim 8, wherein the signaling means is adapted for indicating location of the removable locking device on an outline representation of the aircraft.

10. The detecting system according to claim 8, wherein the signaling means is adapted for transmitting a sound signal when a locking device has been detected.

11. An aircraft comprising a detecting system according to claim 8, wherein the means for reading is linked to at least one antenna mounted on an inner part of a landing gear flap.

12. An aircraft comprising:
   a detecting system according to claim 8, wherein the means for reading is linked to at least one conformal antenna.

* * * * *